(12) United States Patent
Kung et al.

(10) Patent No.: US 6,229,701 B1
(45) Date of Patent: May 8, 2001

(54) PORTABLE COMPUTER WITH HEAT DISSIPATING DEVICE

(75) Inventors: Shao-Tsu Kung; Ming-Shen Sun, both of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/365,198

(22) Filed: Aug. 2, 1999

(51) Int. Cl.[7] ....................................... H05K 7/20
(52) U.S. Cl. ........................ 361/688; 361/690; 361/692; 361/695; 174/16.1; 174/16.3; 165/80.3; 165/185; 312/223.1; 454/184
(58) Field of Search ..................... 361/687–695; 174/15.1, 16.1; 165/80.3, 104.34; 312/223.1; 454/184, 278–280, 309, 313–316, 319, 320, 347, 358

(56) References Cited

U.S. PATENT DOCUMENTS

| | | | |
|---|---|---|---|
| 1,872,599 | * 8/1932 | Le Grand | 49/95 |
| 2,901,961 | * 9/1959 | Cotts | 49/77.1 |
| 3,698,429 | * 10/1972 | Lowe et al. | 137/601.06 |
| 4,621,570 | * 11/1986 | Bolton et al. | 454/319 |
| 4,653,384 | * 3/1987 | Amano | 454/319 |
| 5,470,276 | * 11/1995 | Burnell et al. | 454/155 |
| 5,793,610 | * 8/1998 | Schmitt et al. | 361/695 |
| 6,005,770 | * 12/1999 | Schmitt | 361/695 |

* cited by examiner

Primary Examiner—Leo P. Picard
Assistant Examiner—Boris L. Chervinsky
(74) Attorney, Agent, or Firm—Pillsbury Winthrop LLP

(57) ABSTRACT

A portable computer includes a computer housing and a heat dissipating device. The computer housing has a side wall formed with a ventilation hole. The heat dissipating device includes a plurality of juxtaposed heat dissipating slats mounted pivotally in the ventilation hole and movable between a closed position, where the slats overlap to close the ventilation hole, and an open position, where the slats form clearances thereamong for passage of air through the ventilation hole.

12 Claims, 7 Drawing Sheets

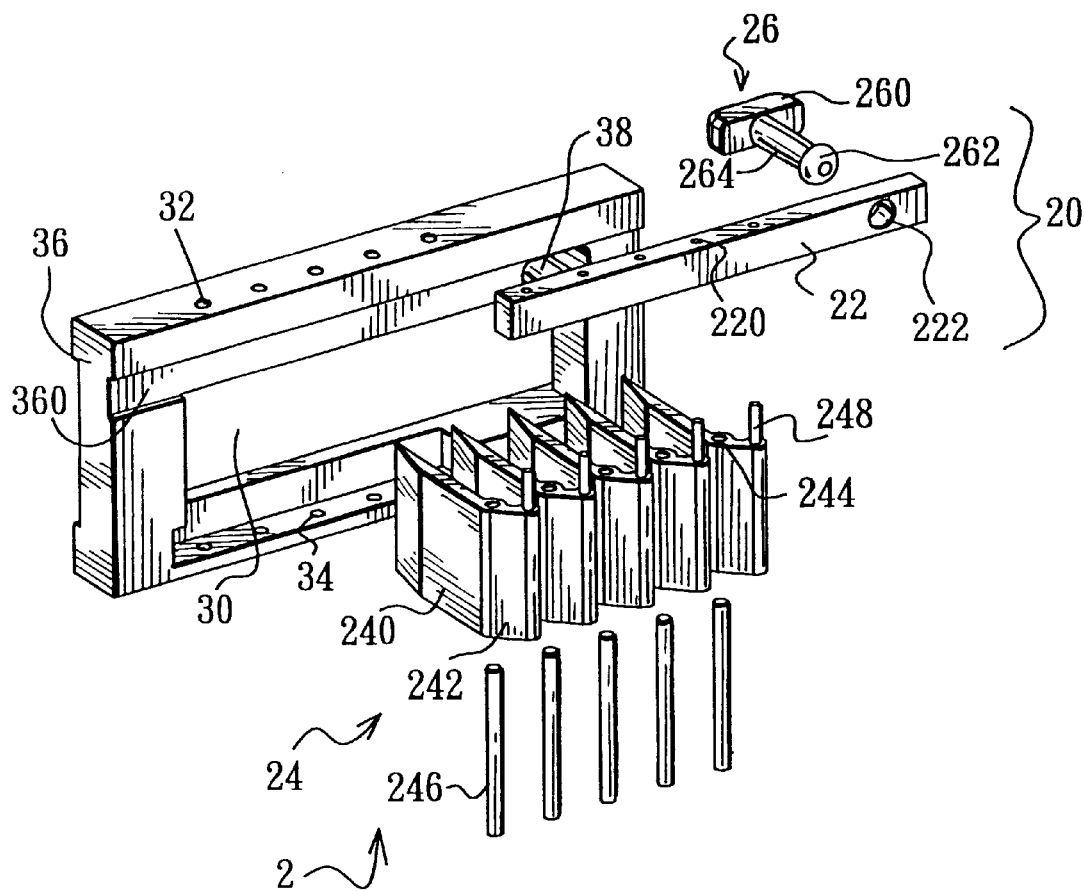
F I G. 3

PORTABLE COMPUTER WITH HEAT DISSIPATING DEVICE

BACKGROUND OF THE INVENTION

1. Field of the Invention

The invention relates to a portable computer, more particularly to a portable computer having a heat dissipating device that includes openable and closable slats.

2. Description of the Related Art

Referring to FIG. 1, a conventional portable computer is shown to include a central processing unit (CPU) 10, and a heat dissipating device 12 disposed on the CPU 10. The heat dissipating device 12 is generally small in size due to the limited space available in the interior of the portable computer. Hence, the heat dissipating effect provided thereby is not very satisfactory.

SUMMARY OF THE INVENTION

Therefore, the main object of the present invention is to provide a portable computer with a heat dissipating device which can achieve an enhanced heat dissipating effect.

Accordingly, the portable computer of the present invention includes a computer housing and a heat dissipating device. The computer housing has a side wall formed with a ventilation hole. The heat dissipating device includes a plurality of juxtaposed heat dissipating slats mounted pivotally in the ventilation hole and movable between a closed position, where the slats overlap to close the ventilation hole, and an open position, where the slats form clearances thereamong for passage of air through the ventilation hole. The heat dissipating device may further include a heat conducting plate mounted in the computer housing and in heat conductive contact with the slats.

BRIEF DESCRIPTION OF THE DRAWINGS

Other features and advantages of the present invention will become apparent in the following detailed description of the preferred embodiments with reference to the accompanying drawings, of which:

FIG. 3 is an exploded perspective view showing a side wall of a computer housing and a heat dissipating device of the preferred embodiment;

DETAILED DESCRIPTION OF THE PREFERRED EMBODIMENTS

Figure 1:
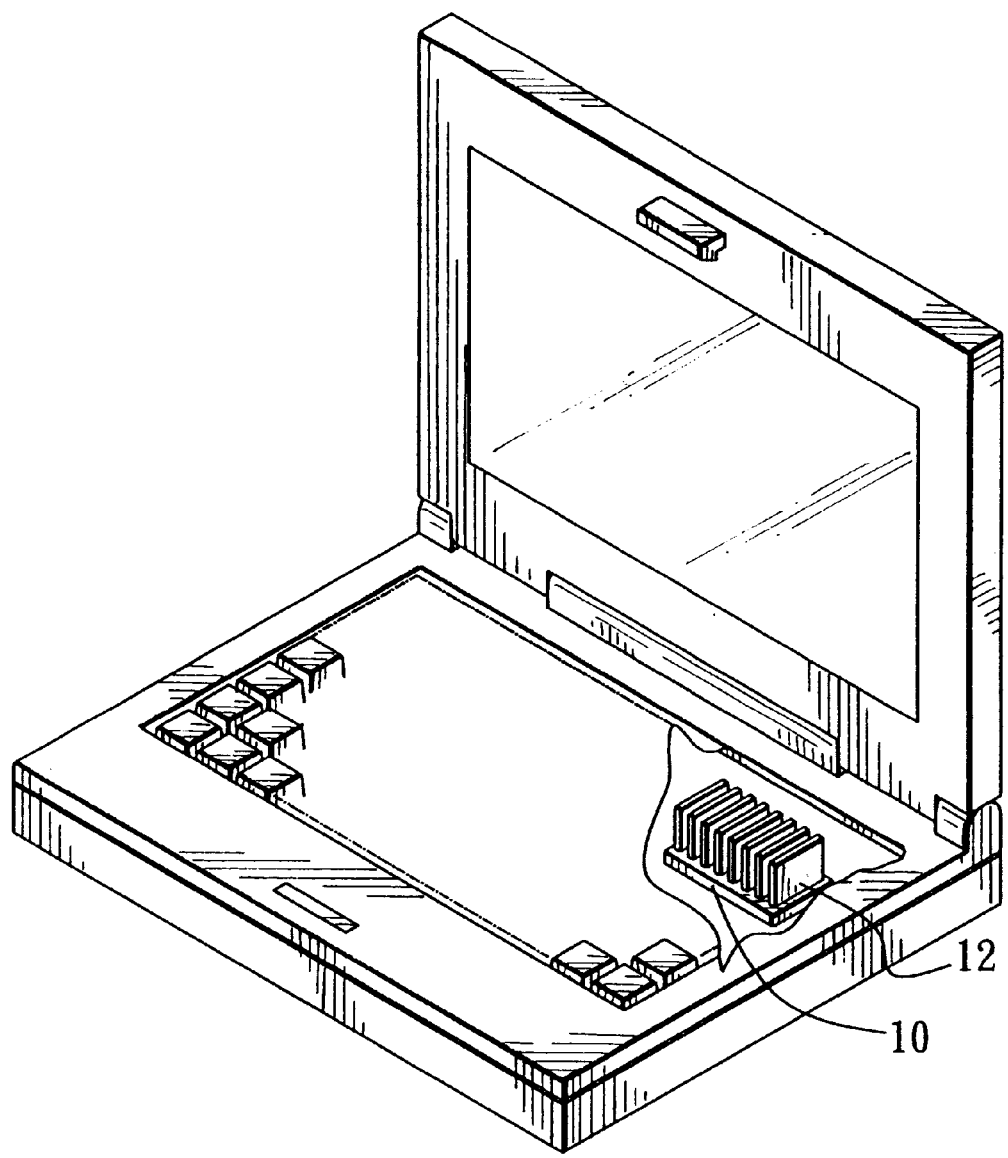
FIG. 1 is a perspective partly cutaway view of a conventional portable computer to illustrate a heat dissipating device thereof.

Before the present invention is described in greater detail, it should be noted that like elements are denoted using the same reference numerals throughout the disclosure.

Figure 2:
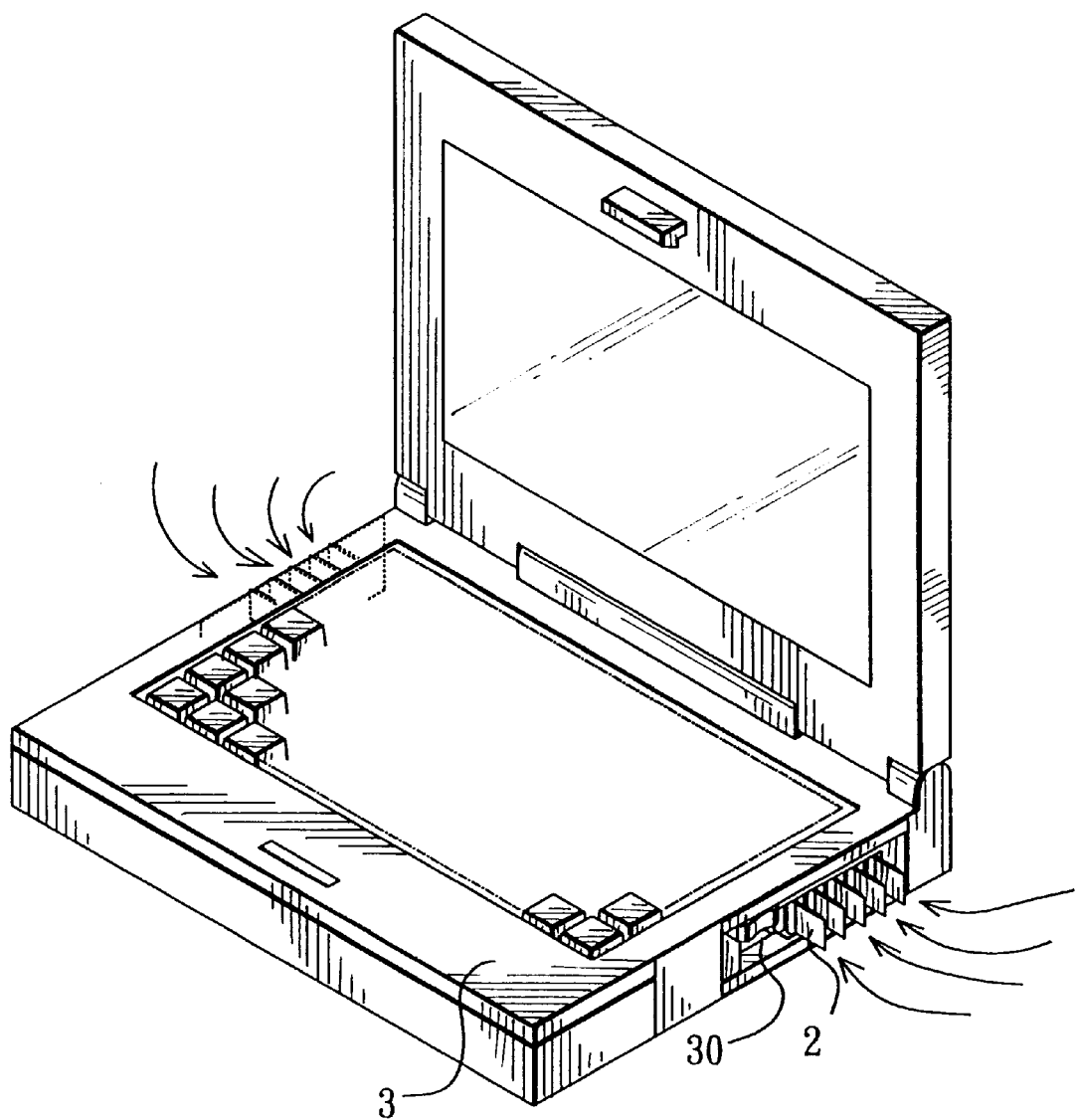
FIG. 2 is a perspective view of a preferred embodiment of a portable computer with a heat dissipating device according to the invention.

Referring to FIGS. 2 and 3, a preferred embodiment of the portable computer of the present invention is shown to include a computer housing 3 and a heat dissipating device 2. The computer housing 3 has a side wall 36 formed with a ventilation hole 30. The ventilation hole 30 is elongated and extends in a longitudinal direction. The ventilation hole 30 has opposed surfaces formed with aligned pairs of axle holes 32, 34. The side wall 36 is formed with a slide hole 38 adjacent to the ventilation hole 30.

Figure 4:
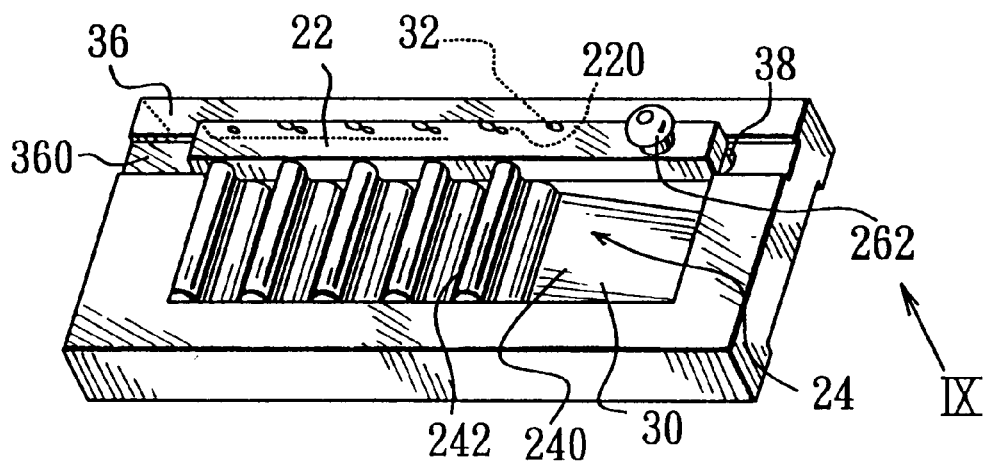
FIG. 4 is an assembled perspective view of the preferred embodiment, showing the slats in a closed position.
Figure 5:
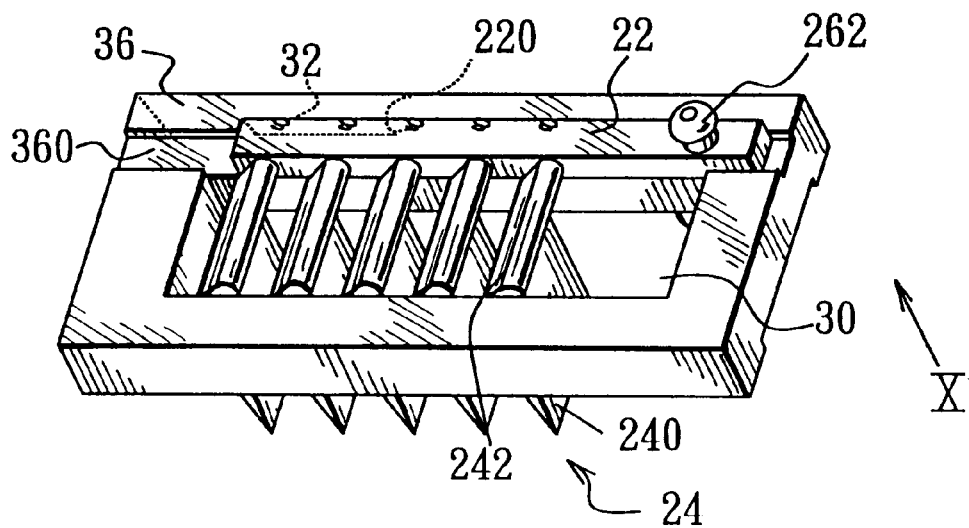
FIG. 5 is an assembled perspective view of the preferred embodiment, showing the slats in an open position.

The heat dissipating device 2 includes a plurality of juxtaposed heat dissipating slats 24 mounted pivotally in the ventilation hole 30 and movable between a closed position, where the slats 24 overlap to close the ventilation hole 30, as shown in FIG. 4, and an open position, where the slats 24 form clearances thereamong for passage of air through the ventilation hole 30, as shown in FIG. 5. The heat dissipating device 2 further includes an actuator 20 connected to the slats 24 and operable so as to move the slats 24 between the closed and open positions. The actuator 20 is mounted slidably on the side wall 36 of the computer housing 3, and includes an elongated link member 22 and a knob member 26 connected to the link member 22. The link member 22 is retained slidably in a slide groove 360 on an inner side of the side wall 36 of the computer housing 3, and has each of the slats 24 connected pivotally thereto. The knob member 26 includes a removable hand-operated cap 260 and a knob rod 264 connected at one end to the cap 260 and having a stop portion 262 at the other end. The knob member 26 is extended through the slide hole 38 and a transverse through hole 222 in the link member 22. The knob member 26 is operable so as to move in the slide hole 38 along the longitudinal direction of the ventilation hole 30 to result in corresponding sliding movement of the link member 22 in the longitudinal direction for pivoting the slats 24 between the closed and open positions. The heat dissipating device 2 further includes a plurality of parallel first axles 246 that mount pivotally and respectively the slats 24 on the side wall 36 of the computer housing 3. Each of the first axles 246 extends in a direction transverse to the longitudinal direction of the ventilation hole 30 through the respective one of the slats 24, and has opposed ends retained in a corresponding one of the pairs of axle holes 32, 34 of the ventilation hole 30.

Each of the slats 24 includes a front plate portion 240 and a rear plate portion 242 that extends at an angle $\geq 0$ from a rear edge of the front plate portion 240. A through hole 244 is provided in the rear edge of the front plate portion 240 and extends longitudinally through the slat 24. Each of the slats 24 is mounted pivotally on the side wall 36 of the computer housing 3 at the rear edge of the front plate portion 240.

The heat dissipating device 2 further includes a plurality of parallel second axles 248 that mount pivotally each of the slats 24 on the link member 22 at a rear end of the rear plate portion 242. The second axles 248 are parallel to the first axles 246 and extend respectively through the slats 24. The link member 22 is further formed with a plurality of axle holes 220 for engaging one end of the second axles 248.

During assembly, the second axle 248 of each of the slats 24 is inserted into the corresponding axle hole 220 of the link member 22. Then, all the slats 24 are placed inside the ventilation hole 30 such that the link member 22 is received in the slide groove 360 of the side wall 36 with the through holes 244 aligned with the axle holes 32, 34. The first axles 246 pass through the corresponding axle holes 32, 34 and the through holes 244 to mount the slats 24 pivotally on the side wall 36. Subsequently, the through hole 222 in the link member 22 is aligned with the slide hole 38 of the computer housing 3, and the end of the knob rod 264 not provided with the stop portion 262 passes through the through hole 222 and the slide hole 38 to be fitted with the cap 260, thereby completing assembly of the heat dissipating device 2 on the computer housing 3. Referring to FIG. 4, the slats 24 are in the closed position. Referring to FIG. 5, the slats 24 are in the open position, in which the link member 22 is displaced to the right.

Figure 6:
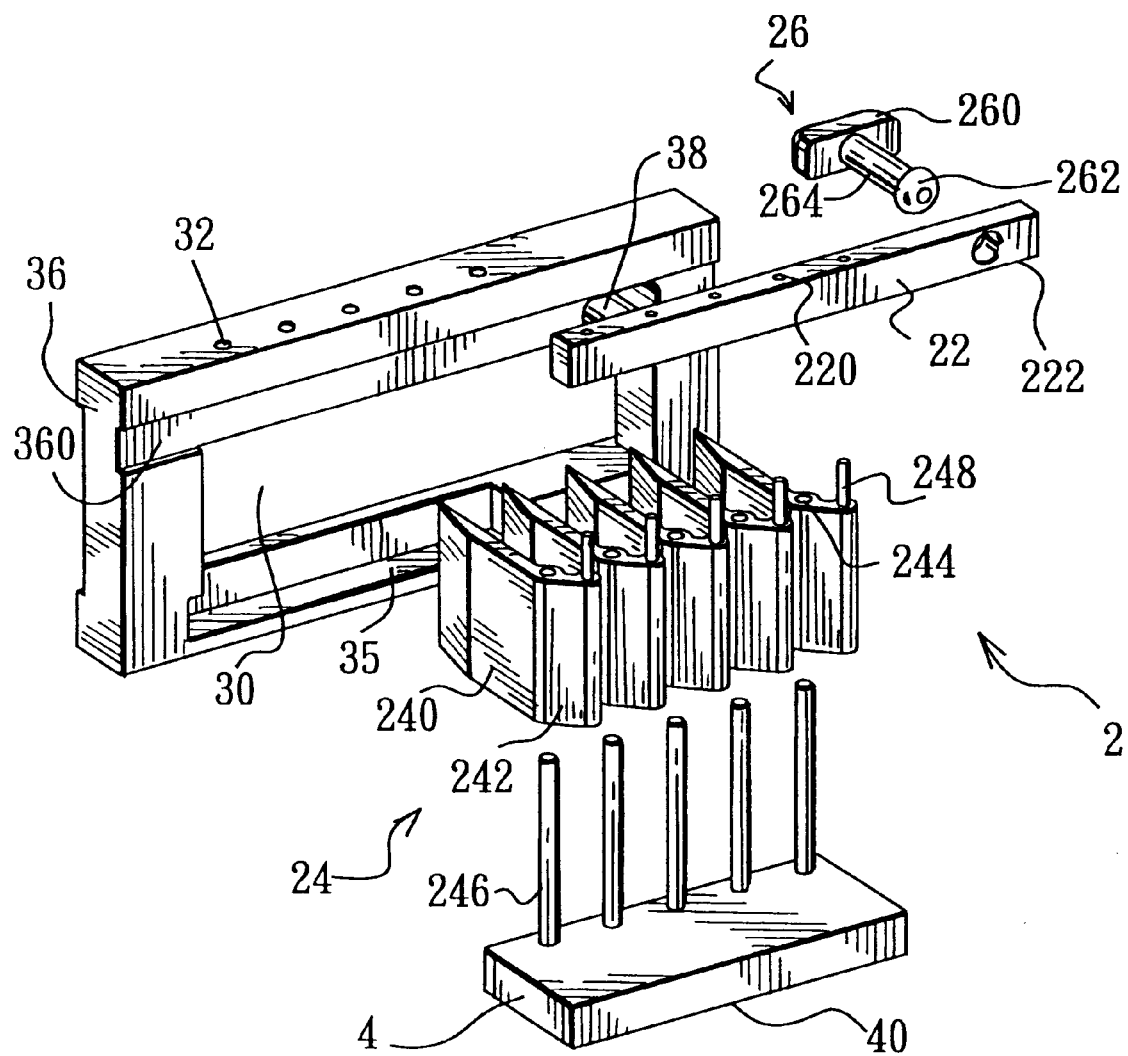
FIG. 6 is an exploded perspective view, similar to FIG. 3, of a modified embodiment of the present invention.
Figure 7:
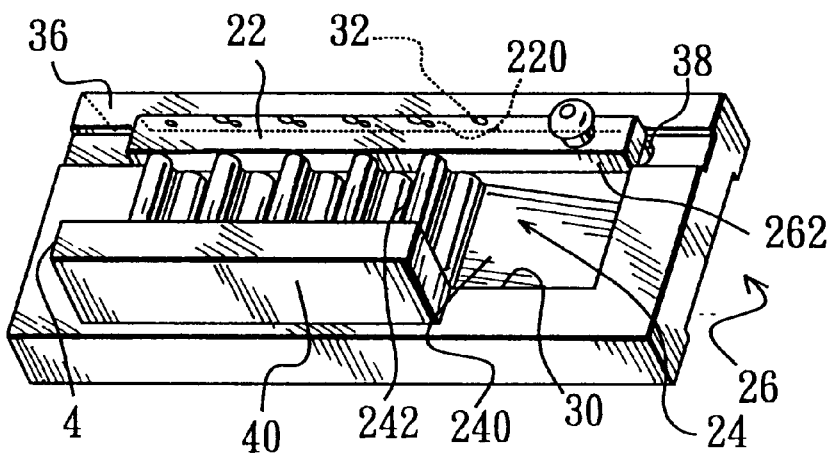
FIG. 7 is an assembled perspective view of the modified embodiment, showing the slats in a closed position.
Figure 8:
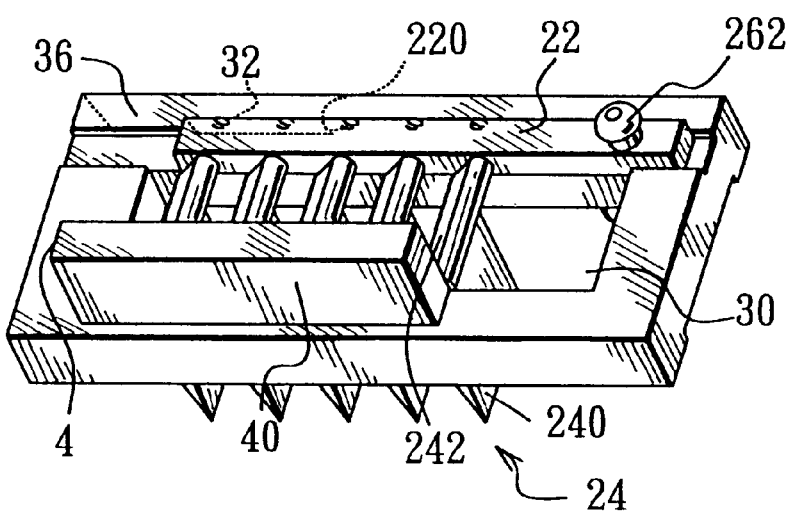
FIG. 8 is an assembled perspective view of the modified embodiment, showing the slats in an open position.

FIG. 6 illustrates a modified embodiment of the present invention. This embodiment differs from the above-described embodiment in that the heat dissipating device 2 further includes a heat conducting plate 4 mounted in the computer housing 3 and in heat conductive contact with the slats 24. Furthermore, the ventilation hole 30 has a lower surface provided with a plate receiving recess 35 for supporting a portion of the heat conducting plate 4. Each of the first axles 246 extends through the respective one of the slats 24 and has a first end mounted on the heat conducting plate 4 to mount the slats 24 on the heat conducting plate 4, and a second end retained in a corresponding one of the axle holes 32 to mount the heat conducting plate 4 in the ventilation hole 30. A bottom surface 40 of the heat conducting plate 4 is in heat conductive contact with a heat emitting surface of a computer component, such as a central processing unit (CPU), to dissipate the heat generated thereby. The heat conducting plate 4 can also extend into relatively hot regions of the computer housing 3 to carry the heat to the slats 24 for dissipation. FIG. 7 illustrates the modified embodiment with the slats 24 in the closed position. FIG. 8 illustrates the modified embodiment with the slats 24 in the open position.

Figure 9:
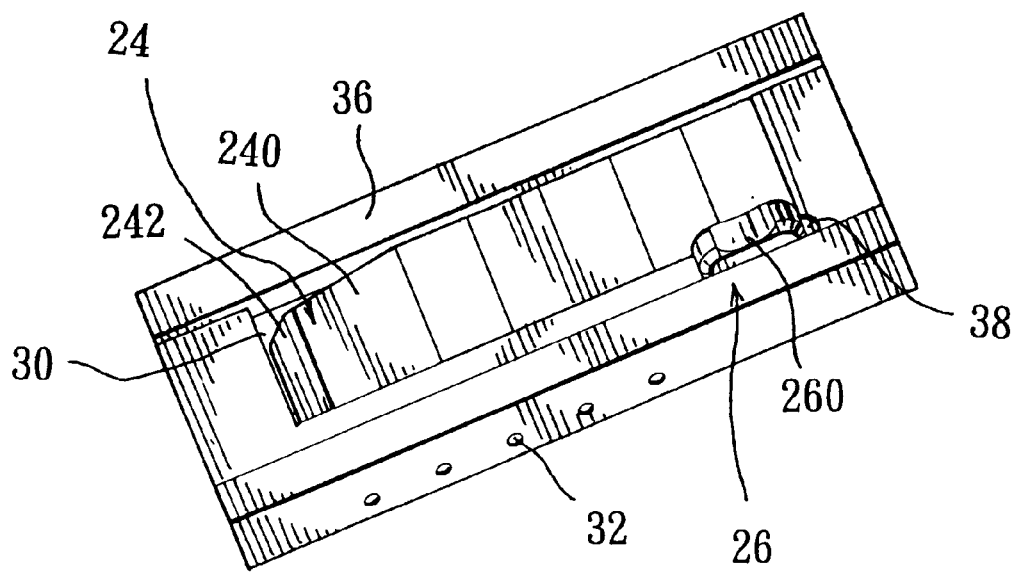
FIG. 9 is an assembled perspective view of FIG. 4 taken along the direction of arrow IX.
Figure 10:
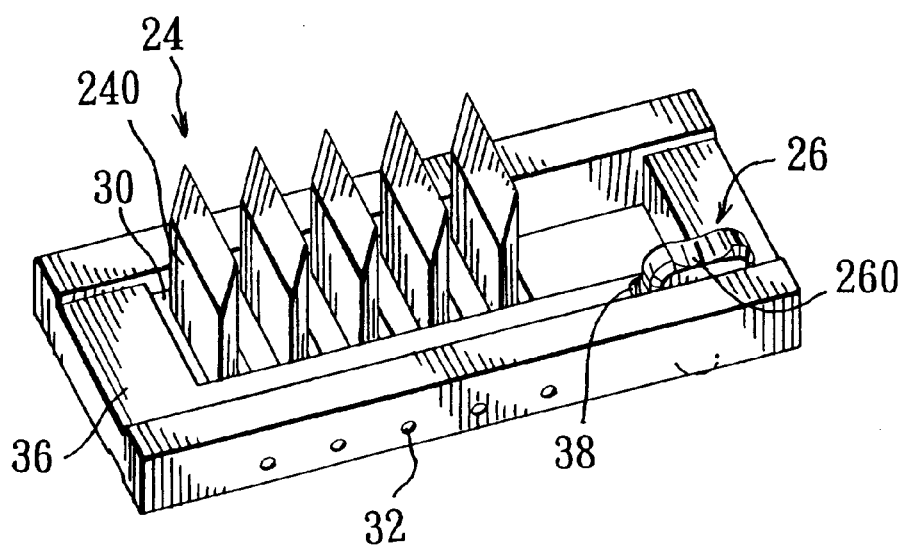
FIG. 10 is an assembled perspective view of FIG. 5 taken along the direction of arrow X.

With reference to FIGS. 9 and 10, it can be clearly seen that, when the knob member 26 is displaced from one end of the slide hole 38 to the other, all the slats 24 are pivotally turned to the open position, which increases the heat dissipating area. At the same time, the clearances formed among the slats 24 allow passage of ambient air via the ventilation hole 30 into the interior of the computer housing 3. Such a construction induces cooler ambient air through the clearances to help dissipate heat of the slats 24 as well as lower the temperature inside the computer housing 3, thereby achieving a higher heat dissipating efficiency.

It should be understood that the arrangement of the axle holes 32, 34, the first axles 246, and the through holes 244 enables the slats 24 to pivot as a result of the displacement of the link member 22. Alternatively, the slats 24 can be modified to have upper and lower resilient posts for engaging the axle holes 32, 34 of the ventilation hole 30. Furthermore, instead of the knob member 26 and the through hole 222, the link member 22 can be configured to have a bent portion at one end to extend from the slide hole 38. In addition, the link member 22 can be designed to have one end extending to a pivot of the portable computer whereby, when the computer is opened, the link member 22 synchronously displaces to move the slats 24 to the open position. In this way, there is no need to provide the knob member 26, the through hole 222, and the slide hole 38.

In view of the aforesaid, the present invention has the following advantages:

1. The slats are controllable to move between open and closed positions.

2. When the slats are closed, they do not occupy significant space in the portable computer.

3. When the slats are open, there is a comparatively large heat dissipating area. Further, the clearances among the slats allow entry of cooler ambient air into the computer housing to achieve a better heat dissipating effect.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A portable computer comprising:

a computer housing having a side wall formed with a ventilation hole; and a heat dissipating device including a plurality of juxtaposed heat dissipating slats mounted pivotally in said ventilation hole and movable between a closed position, where said slats overlap to close said ventilation hole, and an open position, where said slats form clearances thereamong for passage of air through said ventilation hole, wherein said heat dissipating device further includes an actuator connected to said slats and operable so as to move said slats between the closed and open positions wherein said actuator is mounted slidably on said side wall of said computer housing, and wherein said side wall is formed with a slide hole adjacent to said ventilation hole, and said actuator includes:

an elongated link member slidably retained on an inner side of said side wall and having each of said slats connected pivotally thereto; and a knob member connected to said link member and extended through said slide hole, said knob member being operable so as to move in said slide hole for moving said link member and pivoting said slats between the closed and open positions.

2. The portable computer as claimed in claim 1, wherein each of said slats includes a front plate portion and a rear plate portion that extends at an angle from a rear edge of said front plate portion.

3. The portable computer as claimed in claim 2, wherein each of said slats is mounted pivotally on said side wall at said rear edge of said front plate portion.

4. The portable computer as claimed in claim 3, wherein said heat dissipating device further includes a plurality of parallel first axles that mount pivotally and respectively said slats on said side wall.

5. The portable computer as claimed in claim 4, wherein said ventilation hole is elongated and extends in a longitudinal direction, each of said first axles extends in a direction transverse to the longitudinal direction, and said knob member is movable in the longitudinal direction in said slide hole to result in corresponding sliding movement of said link member in the longitudinal direction.

6. The portable computer as claimed in claim 5, wherein said ventilation hole has opposed surfaces formed with aligned pairs of axle holes, each of said first axles extending through the respective one of said slats and having opposed ends retained in a corresponding one of said pairs of axle holes.

7. The portable computer as claimed in claim 5, wherein each of said slats is mounted pivotally on said link member at a rear end of said rear plate portion.

8. The portable computer as claimed in claim 7, wherein said heat dissipating device further includes a plurality of parallel second axles that mount pivotally and respectively said slats on said link member.

9. The portable computer as claimed in claim 8, wherein said second axles are parallel to said first axles and extend respectively through said slats, and said link member is formed with a plurality of axle holes for engaging one end of said second axles.

10. The portable computer as claimed in claim 5, wherein said heat dissipating device further includes a heat conducting plate mounted in said computer housing and in heat conductive contact with said slats.

11. The portable computer as claimed in claim 10, wherein said ventilation hole has a surface formed with a plurality of axle holes, each of said first axles extending through the respective one of said slats and having a first end mounted on said heat conducting plate, and a second end retained in a corresponding one of said axle holes.

12. A portable computer comprising:
a computer housing having a side wall formed with a ventilation hole; and
a heat dissipating device including a plurality of juxtaposed heat dissipating slats mounted pivotally in said ventilation hole and movable between a closed position, where said slats overlap to close said ventilation hole, and an open position, where said slats form clearances thereamong for passage of air through said ventilation hole,
wherein said heat dissipating device further includes a heat conducting plate mounted in said computer housing and in heat conductive contact with said slats.

* * * * *